United States Patent
Kosaka et al.

(10) Patent No.: US 8,666,575 B2
(45) Date of Patent: Mar. 4, 2014

(54) INVERTED TWO-WHEEL APPARATUS, AND CONTROL METHOD AND CONTROL PROGRAM THEREOF

(75) Inventors: Yusuke Kosaka, Chofu (JP); Susumu Oikawa, Yokohama (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 184 days.

(21) Appl. No.: 13/124,782

(22) PCT Filed: Mar. 5, 2010

(86) PCT No.: PCT/JP2010/001556
§ 371 (c)(1),
(2), (4) Date: Apr. 18, 2011

(87) PCT Pub. No.: WO2011/108029
PCT Pub. Date: Sep. 9, 2011

(65) Prior Publication Data
US 2011/0282532 A1    Nov. 17, 2011

(51) Int. Cl.
*B60L 11/00*    (2006.01)
(52) U.S. Cl.
USPC ................... 701/22; 701/37; 701/70; 701/124
(58) Field of Classification Search
USPC ........................................ 701/22, 70, 124, 37
See application file for complete search history.

(56) References Cited

U.S. PATENT DOCUMENTS

| | | | |
|---|---|---|---|
| 6,332,103 B1 * | 12/2001 | Steenson et al. ............ | 701/1 |
| 7,370,713 B1 * | 5/2008 | Kamen ...................... | 180/7.1 |
| 7,783,392 B2 * | 8/2010 | Oikawa ....................... | 701/1 |
| 8,170,781 B2 * | 5/2012 | Fuwa ........................ | 701/124 |
| 8,224,524 B2 * | 7/2012 | Nakashima et al. ........ | 701/38 |
| 8,271,185 B2 * | 9/2012 | Doi ........................... | 701/124 |
| 2007/0084662 A1 * | 4/2007 | Oikawa .................... | 180/272 |
| 2009/0315293 A1 * | 12/2009 | Kosaka ..................... | 280/208 |
| 2009/0319124 A1 * | 12/2009 | Fuwa ........................ | 701/37 |
| 2010/0025139 A1 * | 2/2010 | Kosaka et al. ............ | 180/218 |
| 2010/0060225 A1 * | 3/2010 | Kosaka ..................... | 318/566 |

(Continued)

FOREIGN PATENT DOCUMENTS

| | | |
|---|---|---|
| CN | 101500866 A | 8/2009 |
| JP | 11-500331 A | 1/1999 |

(Continued)

OTHER PUBLICATIONS

Office Action issued Jul. 10, 2012 in Japanese Patent Application No. 2011-506279 and English translation thereof.

(Continued)

*Primary Examiner* — John R Olszewski
*Assistant Examiner* — Truc M Do
(74) *Attorney, Agent, or Firm* — Kenyon & Kenyon LLP

(57) ABSTRACT

An inverted two-wheel apparatus includes drive means that drives wheels; control means that generates a torque command value to control drive torque of the drive means; and posture detection means that detects posture information of a vehicle. The inverted two-wheel apparatus is able to travel while keeping an inverted state. Furthermore, the control means performs control to dismount an occupant upon judgment that the torque command value that is generated is equal to or more than a predetermined value, which means in a saturation state, and inverted control is in a failure state based on the posture information detected by the posture detection means.

7 Claims, 6 Drawing Sheets

(56) References Cited

U.S. PATENT DOCUMENTS

| | | | |
|---|---|---|---|
| 2010/0114421 A1* | 5/2010 | Doi | 701/29 |
| 2010/0168993 A1* | 7/2010 | Doi et al. | 701/124 |
| 2011/0060513 A1 | 3/2011 | Oikawa et al. | |

FOREIGN PATENT DOCUMENTS

| | | | |
|---|---|---|---|
| JP | 2004-276727 A | 10/2004 |
| JP | 2006-001384 A | 1/2006 |
| JP | 2006-315666 A | 11/2006 |
| JP | 2008-056169 A | 3/2008 |
| JP | 2008-254527 A | 10/2008 |
| JP | 2008-290718 A | 12/2008 |
| JP | 2009-101760 A | 5/2009 |
| JP | 2010-030436 A | 2/2010 |
| JP | 2011-051557 A | 3/2011 |
| WO | 2008/133001 A1 | 11/2008 |

OTHER PUBLICATIONS

International Search Report of PCT/JP2010/001556, Jun. 15, 2010.

* cited by examiner

INVERTED TWO-WHEEL APPARATUS, AND CONTROL METHOD AND CONTROL PROGRAM THEREOF

This is a 371 national phase application of PCT/JP2010/001556 filed 5 Mar. 2010, the content of which is incorporated herein by reference.

TECHNICAL FIELD

The present invention relates to an inverted two-wheel apparatus that travels while keeping an inverted state, and a control method and a control program thereof.

BACKGROUND ART

An inverted two-wheel apparatus is known that executes desired travelling while keeping an inverted state according to travelling operation by an occupant to move a center of gravity forwardly/backwardly or laterally (see patent document 1, for example).

CITATION LIST

Patent Literature 1

Japanese Unexamined Patent Application Publication No. 2006-315666

SUMMARY OF INVENTION

Technical Problem

In an inverted two-wheel apparatus shown in the patent document 1, when an occupant excessively moves a center of gravity in the forward direction in acceleration, the vehicle inclines forward too much. Then a torque command value to an electric motor that drives a wheel becomes maximum, which makes an output of the electric motor maximum value. In this case, if a pitch angle is generated in the forward-inclined direction and a pitch angular velocity is generated forward, while the vehicle tends to invert forwardly, the torque of the electric motor is not output any more. Then it is impossible to recover the posture, and the inverted control is in a failure state. Furthermore, since the vehicle inclines forwardly while the vehicle speed increases, the vehicle may be turned over while keeping the high vehicle velocity.

The present invention has been made in order to solve such problems, and aims to provide an inverted two-wheel apparatus with improved safety, and a control method and a control program thereof.

Solution to Problem

An aspect of the present invention to achieve the object stated above is an inverted two-wheel apparatus that travels while keeping an inverted state, the inverted two-wheel apparatus including drive means that drives wheels; control means that generates a torque command value to control drive torque of the drive means; and posture sensor means that detects posture information of a vehicle; in which the control means performs control to dismount an occupant upon judgment that the torque command value that is generated is equal to or more than a predetermined value, which means in a saturation state, and inverted control is in a failure state based on the posture information detected by the posture detection means.

In this aspect, the control means may execute other velocity control that is separated from the inverted control upon judgment that the torque command value that is generated is equal to or more than a predetermined value, which means in a saturation state, and inverted control is in a failure state based on the posture information detected by the posture detection means.

In this aspect, the inverted two-wheel apparatus further includes vehicle velocity detection means that detects vehicle velocity, in which the control means may control the drive means to make the vehicle stopped state upon judgment that the torque command value that is generated is equal to or more than a predetermined value, which means a saturation state, inverted control is in a failure state based on the posture information detected by the posture detection means, and the vehicle velocity detected by the vehicle velocity detection means is equal to or lower than a predetermined velocity.

Further, in this aspect, the control means may execute the velocity control to gradually decrease the vehicle velocity.

Furthermore, in this aspect, the inverted two-wheel apparatus may further includes vehicle velocity detection means that detects vehicle velocity; and rotation detection means that detects rotation information of the wheel, in which the control means includes a controller that generates a velocity command value based on the posture information detected by the posture detection means, the vehicle velocity detected by the vehicle velocity detection means, and the rotation information detected by the rotation detection means; and a velocity controller that generates the torque command value based on the velocity command value generated by the controller and the rotation information detected by the rotation detection means.

Another aspect of the present invention to achieve the object stated above may be a control method of an inverted two-wheel apparatus that travels while keeping an inverted state, the method including the steps of generating a torque command value to control drive torque of drive means that drives a wheel; detecting posture information of a vehicle; and executing control to dismount an occupant upon judgment that the torque command value that is generated is equal to or more than a predetermined value, which means in a saturation state, and inverted control is in a failure state based on the posture information that is detected.

Another aspect of the present invention to achieve the object stated above may be a control program of an inverted two-wheel apparatus that travels while keeping an inverted state, the control program causing a computer to execute the following processing of generating a torque command value to control drive torque of drive means that drives a wheel; and executing control to dismount an occupant upon judgment that the torque command value that is generated is equal to or more than a predetermined value, which means in a saturation state, and inverted control is in a failure state based on the posture information of the vehicle.

Further aspect of the present invention to achieve the object stated above is an inverted two-wheel apparatus that travels while keeping an inverted state, the inverted two-wheel apparatus including wheel drive units that drives wheels; a control device that generates a torque command value to control drive torque of the wheel drive units; and a posture sensor that detects posture information of a vehicle, in which the control device executes control to dismount an occupant upon judgment that the torque command value that is generated is equal to or more than a predetermined value, which means in a saturation state, and inverted control is in a failure state based on the posture information detected by the posture sensor.

Advantageous Effects of Invention

According to the present invention, it is possible to provide an inverted two-wheel apparatus with improved safety, and a control method and a control program thereof.

DESCRIPTION OF EMBODIMENTS

Figure 1:
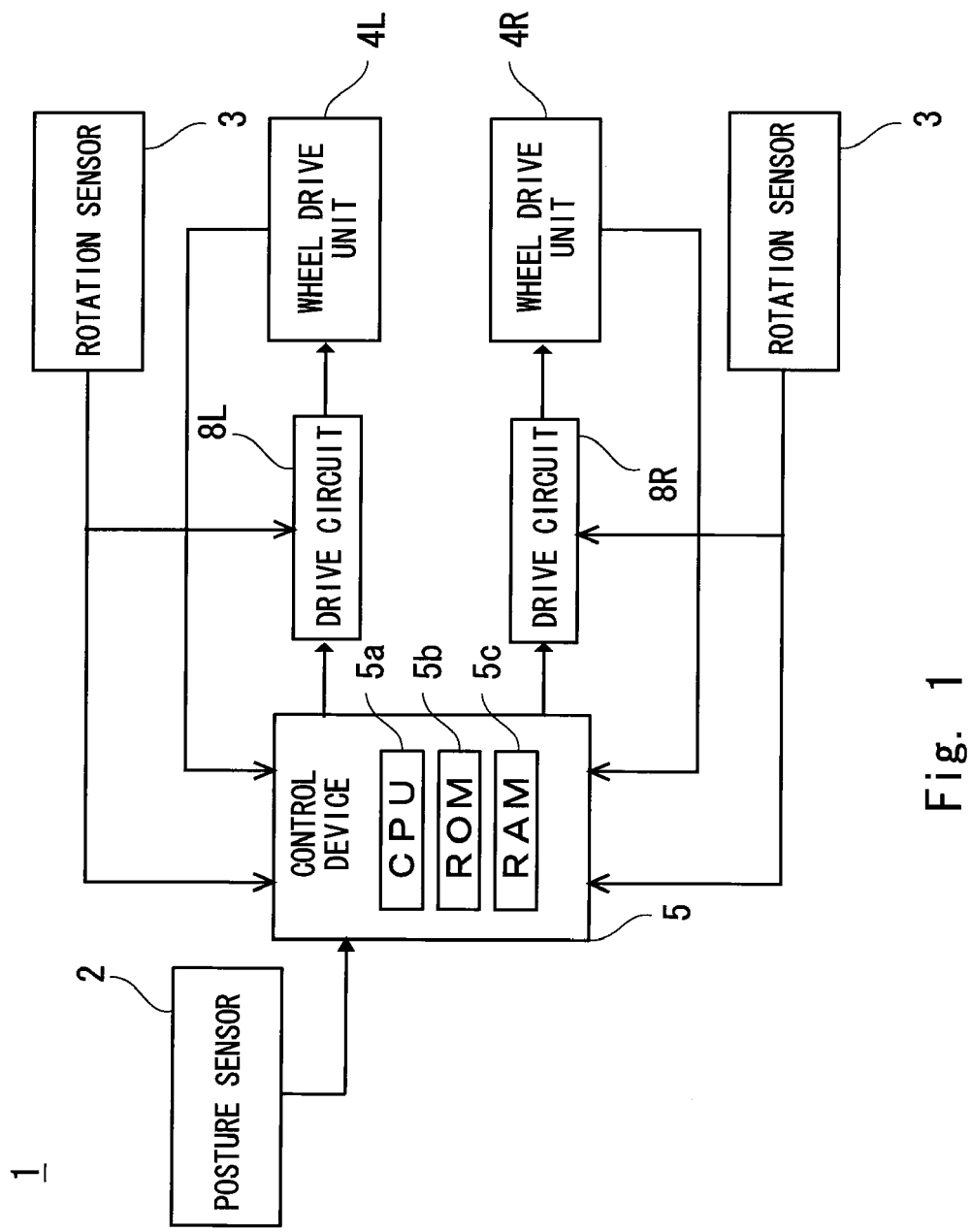
FIG. 1 is a block diagram showing a schematic system configuration of an inverted two-wheel apparatus according to an embodiment of the present invention.
Figure 2:
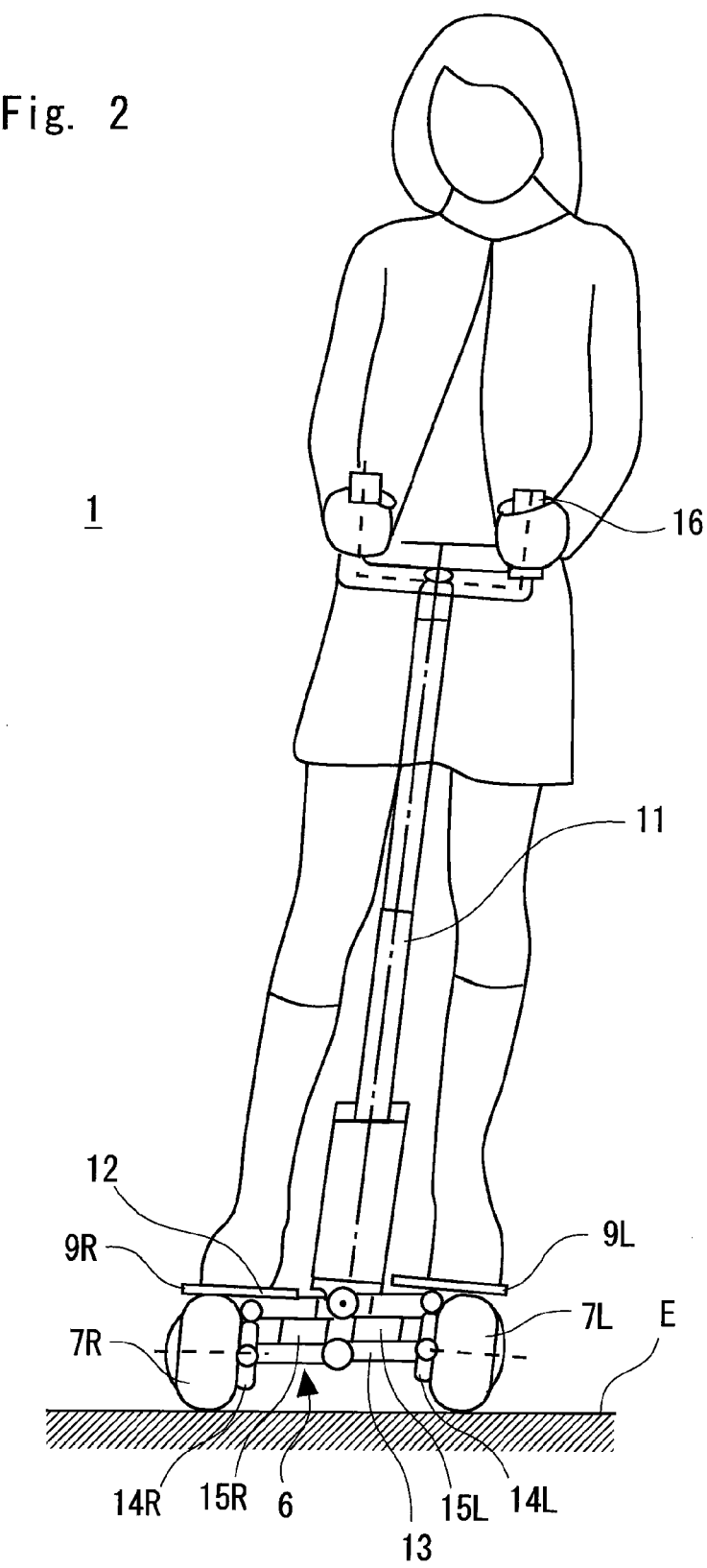
FIG. 2 is a front view showing a schematic configuration of the inverted two-wheel apparatus according to the embodiment of the present invention.

Hereinafter, an embodiment of the present invention will be described with reference to the drawings. FIG. 1 is a block diagram showing a schematic system configuration of an inverted two-wheel apparatus according to an embodiment of the present invention. FIG. 2 is a front view showing a schematic configuration of the inverted two-wheel apparatus according to the embodiment of the present invention. An inverted two-wheel apparatus 1 according to the embodiment includes a posture sensor 2, a rotation sensor 3, a pair of wheel drive units 4L and 4R, and a control device 5.

Further, the inverted two-wheel apparatus 1 is configured as a standing ride type coaxial two-wheel vehicle on which an occupant can mount while standing on a vehicle body 6, for example. Further, this coaxial two-wheel vehicle is configured so that the vehicle moves in the forward or backward direction by the occupant moving a center of gravity forwardly or backwardly and performs left turn or right turn by the occupant moving a center of gravity in the lateral direction.

The posture sensor 2 is one specified example of the posture detection means, and detects posture information including an inclination angle including a pitch angle and a roll angle, an inclination angular velocity including a pitch angular velocity and a roll angular velocity, an inclination angular acceleration including a pitch angular acceleration and a roll angular acceleration in the vehicle body 6. The posture sensor 2 is able to detect a pitch angle, a pitch angular velocity, or a pitch angular acceleration of the vehicle body 6 generated by the occupant moving a center of gravity forwardly or backwardly, for example, or a roll angle, a roll angular velocity, or a roll angular acceleration of the vehicle body 6 (or divided steps 9L and 9R) generated by the occupant moving a center of gravity in the lateral direction.

The posture sensor 2 is connected to the control device 5, and outputs posture information of the vehicle body 6 that is detected to the control device 5. Note that the posture sensor 2 includes, e.g., a gyro sensor and an acceleration sensor. The pitch axis is the axis corresponding to axle of a pair of wheels 7L and 7R. Further, the roll axis is the axis that passes through the center of the vehicle body 6 and is parallel with a travelling direction of the inverted two-wheel apparatus 1.

The rotation sensor 3 is one specified example of the rotation detection means, and detects rotation information including a rotation angle, a rotation speed, a rotation acceleration or the like of the wheels 7L and 7R provided in the vehicle body 6. The rotation sensor 3 is connected to the control device 5, and outputs the rotation information of each of the wheels 7L and 7R that is detected to the control device 5. Further, the control device 5 is able to calculate the acceleration, vehicle velocity, movement amount and the like of the inverted two-wheel apparatus 1 using the rotation information (e.g., rotation angle, rotation speed, rotation acceleration) of each of the wheels 7L and 7R that is detected by the rotation sensor 3.

The pair of wheel drive units 4L and 4R drive right and left pair of wheels 7L and 7R rotatably provided in the vehicle body 6, so as to travel the inverted two-wheel apparatus 1. Each of the wheel drive units 4L and 4R may include an electric motor, a deceleration mechanism connected to a rotation axis of the electric motor to be capable of transmitting power and the like, for example. Each of the wheel drive units 4L and 4R is connected to the control device 5 through drive circuits 8L and 8R, and controls the drive of each of the wheels 7L and 7R in accordance with the control signal from the control device 5.

The control device 5 is one specified example of the control means, and controls each of the wheel drive units 4L and 4R to control the rotation of each of the wheels 7L and 7R so that the inverted two-wheel apparatus 1 performs desired travelling (e.g., forward movements, backward movements, accelerations, decelerations, stops, left turns, and right turns) while performing the inverted control to keep the inverted state. The control device 5 further performs known controls including a feedback control and a robust control based on the posture information of the inverted two-wheel apparatus 1 detected by the posture sensor 2 and the rotation information of each of the wheels 7L and 7R detected by the rotation sensor 3.

For example, the control device 5 controls the rotation of each of the wheels 7L and 7R by way of each of the wheel drive units 4L and 4R in accordance with the pitch angle of the vehicle body 6 detected by the posture sensor 2 when the occupant moves a center of gravity in the forward or backward direction, so as to move the inverted two-wheel apparatus 1 in the forward direction or backward direction. Further, when the occupant moves the center of gravity in the left or right direction, the control device 5 controls each of the wheel drive units 4L and 4R to generate the rotation difference between the right and left wheels 7L and 7R according to the roll angle of the vehicle body 6 detected by the posture sensor 2, so as to rotate the inverted two-wheel apparatus 1 in the left or right direction.

Further, the control device 5 multiplies the pitch angle of the vehicle body 6 detected by the posture sensor 2 by a predetermined control gain, for example, to calculate the rotation torque of each of the wheels 7L and 7R. The control device 5 then controls each of the wheel drive units 4L and 4R so that the rotation torque that is calculated is generated in each of the wheels 7L and 7R.

Accordingly, the control device 5 performs inverted control to rotate each of the wheels 7L and 7R in the direction in which the vehicle body 6 is inclined, and moves the position of the center of gravity of the inverted two-wheel apparatus 1 back to the vertical line that passes through the axle of each of the wheels 7L and 7R. Further, the control device 5 applies appropriate rotation torque to each of the wheels 7L and 7R, so as to perform movement control of the inverted two-wheel apparatus 1 such as forward movements, backward movements, stops, decelerations, accelerations, left turns, and right turns according to the posture information from the posture sensor 2 while keeping the inverted state so that the pitch angle of the vehicle body 6 does not exceed a certain value.

According to the configuration of the vehicle control as stated above, the inverted two-wheel apparatus 1 can be moved in the forward or backward direction by the occupant moving a center of gravity forwardly or backwardly to incline the vehicle body 6 forwardly or backwardly, and can perform left turn or right turn by the occupant moving a center of gravity in the lateral direction to incline the vehicle body 6 in the lateral direction. The inverted two-wheel apparatus 1 may have a configuration to perform left turn or right turn using a turning operation unit (e.g., turning ring, handle 11) that supplies to the control device 5 a manipulation signal according to a manipulation by the occupant to turn the vehicle in a direction in which the occupant intends to make a turn.

The control device 5 is configured by hardware, including a microcomputer that includes a CPU (Central Processing Unit) 5a that performs control processing, calculation processing and the like, a ROM (Read Only Memory) 5b that stores the control program, the calculation program and the like executed by the CPU 5a, and a RAM (Random Access Memory) 5c that stores processed data and the like.

The inverted two-wheel apparatus 1 is configured, as shown in FIG. 2, as a coaxial two-wheel vehicle, and includes the vehicle body 6, wheels 7L and 7R, divided steps 9L and 9R, the handle 11 and the like. The right and left pair of divided steps 9L and 9R are one example of a step plate for a driver to ride. The vehicle body 6 supports each of the divided steps 9L and 9R to be capable of changing the posture in the roll direction. The right and left pair of wheels 7L and 7R are rotatably supported by the vehicle body 6. The handle 11 is a manipulation lever that changes the posture of each of the divided steps 9L and 9R in the direction of roll through the vehicle body 6.

The vehicle body 6 is configured as a parallel link mechanism that includes a vehicle body upper member 12 and a vehicle body lower member 13 that are disposed above and below in parallel with each other, and a pair of lateral members 14L and 14R that are disposed left and right in parallel with each other and coupled to the vehicle body upper member 12 and the vehicle body lower member 13 in a turnable manner.

A pair of coil springs 15L, 15R that generate spring force to maintain the angle formed by the vehicle body upper member 12 and the vehicle body lower member 13 and the pair of lateral members 14L and 14R to be orthogonal are provided between the vehicle body upper member 12 and the vehicle body lower member 13 of the parallel link mechanism. The wheel drive units 4L and 4R are attached to each outer surface of the pair of lateral members 14L and 14R, respectively.

As stated above, the pair of wheels 7L and 7R that are supported by the pair of lateral members 14L and 14R through the pair of wheel drive units 4L and 4R have the center of rotation corresponding with each other on the same axis center line when being positioned on a flat road surface E. Although the inverted two-wheel apparatus 1 is configured as a coaxial two-wheel vehicle, the example is not limited to it. For example, the inverted two-wheel apparatus 1 can be applicable to any vehicle that is operated by the occupant moving the center of gravity and performs inverted control.

In the conventional inverted two-wheel apparatus, for example, when the occupant excessively moves the center of gravity of the vehicle in the forward direction in acceleration, the vehicle inclines forward too much. Then a torque command value to the electric motor in each wheel drive unit becomes max. Thus, the output of the electric motor reaches the maximum value (positive direction), and is in the saturation state. In this case, if a pitch angle of the vehicle body is generated in the forward-inclined direction and the pitch angular velocity is generated at the front of the travelling direction (inverting direction), while the vehicle tends to invert forwardly, the torque of the electric motor is in the saturation state and is not output any more. Then it is impossible to recover the posture of the vehicle, and the inverted control is in the failure state (control disabled state). Further, since the vehicle inclines forwardly while the vehicle speed increases, the vehicle may be turned over while keeping the high vehicle velocity.

Similarly, when the occupant excessively moves the center of gravity of the vehicle in the backward direction in deceleration, the vehicle inclines backward too much. Then a torque command value to the electric motor in each wheel drive unit becomes max. Thus, the output of the electric motor reaches the maximum value (negative direction), and is in the saturation state. In this case, if a pitch angle of the vehicle body is generated in the backward-inclined direction and the pitch angular velocity is generated at the rear of the travelling direction (inverting direction), while the vehicle tends to invert backwardly, the torque of the electric motor is in the saturation state and not output any more. Then it is impossible to recover the posture of the vehicle, and the inverted control is in the failure state. The vehicle may be turned over backward while not sufficiently decreasing the speed, or may be accelerated backward after deceleration and stop, which may result in turnover.

In the inverted two-wheel apparatus 1 according to the embodiment, when the control device 5 judges that the torque command value to the wheel drive units 4L and 4R is equal to or more than a predetermined value, which means in the saturation state, and the inverted control is in the failure state based on the posture information detected by the posture sensor 2, the control device 5 executes control to dismount the occupant. Accordingly, it is possible to decelerate and stop the inverted two-wheel apparatus 1 without failure and to dismount the occupant safely even when the torque command value to the wheel drive units 4L and 4R is equal to or more than a predetermined value, which means in the saturation state, and the inverted control is disabled since the inverted control is in the failure state. Accordingly, it is possible to further improve the safety of the inverted two-wheel apparatus 1.

Figure 3:
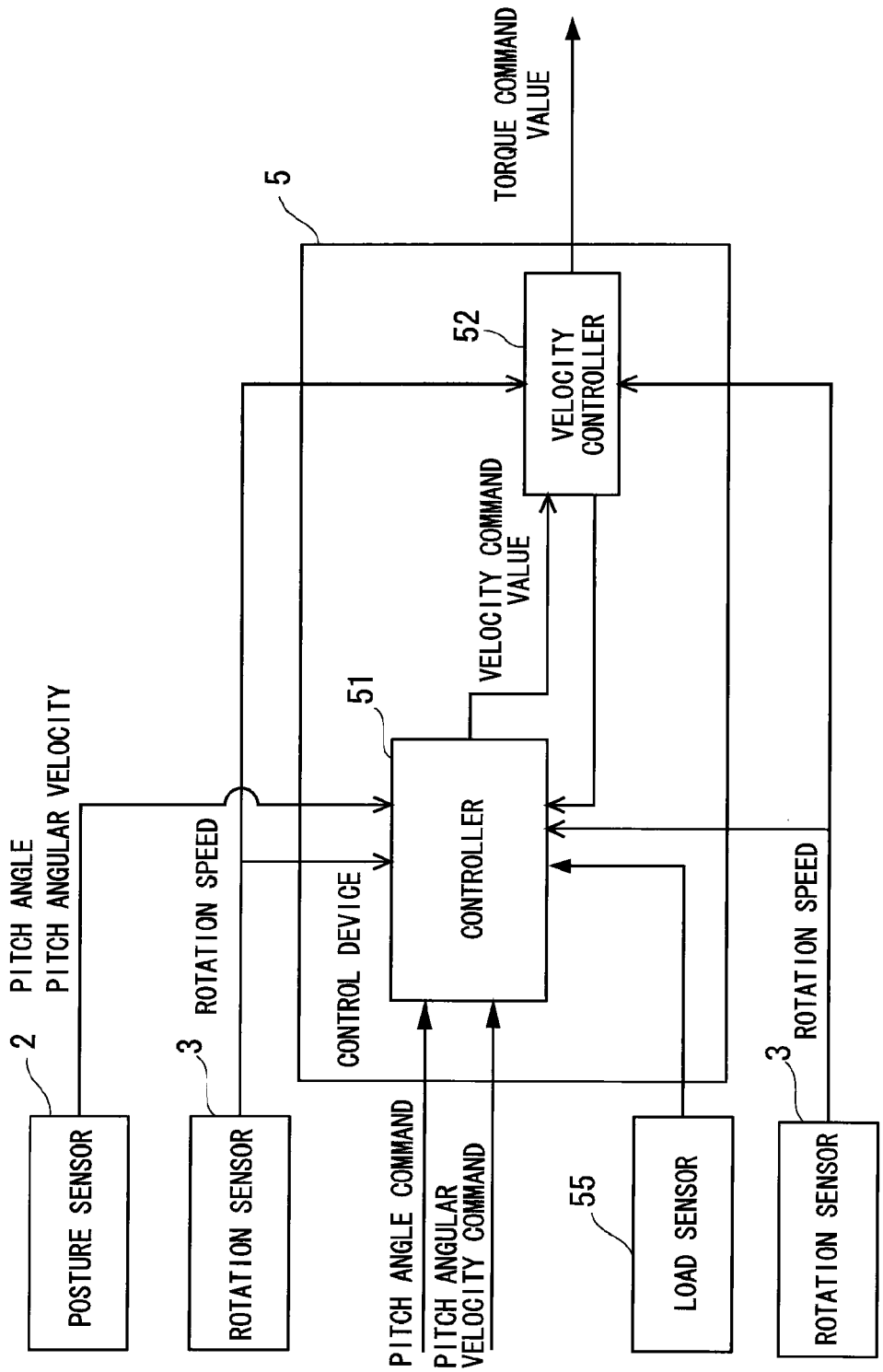
FIG. 3 is a block diagram showing a schematic system configuration of a control device of the inverted two-wheel apparatus according to the embodiment of the present invention.

FIG. 3 is a block diagram showing a schematic system configuration of the control device of the inverted two-wheel apparatus according to the embodiment. The control device 5 according to the embodiment includes a controller 51 that generates a velocity command value to determine a vehicle velocity of the inverted two-wheel apparatus 1, and a velocity controller 52 that generates a torque command value to control the drive torque of each of the wheel drive units 4L and 4R based on the velocity command value generated by the controller 51.

The controller 51 generates a velocity command value based on a pitch angle command value and a pitch angular velocity command value that determine the inclination state of the vehicle body 6, a pitch angle and a pitch angular velocity detected by the posture sensor 2, a rotation velocity of each of the wheels 7L and 7R detected by the rotation sensor 3, and a vehicle velocity calculated based on the rotation information of each of the wheels 7L and 7R, and outputs the generated velocity command value to the velocity controller 52.

Further, the controller 51 judges whether the inverted control is in the failure state based on the pitch angle and the pitch angular velocity detected by the posture sensor 2. For example, the controller 51 judges that the inverted control is in the failure state when the torque command value is saturated in the positive direction, the pitch angle detected by the posture sensor 2 is in the forward-inclined direction of the vehicle body 6, and the pitch angular velocity is in the positive direction. In the same way, the controller 51 judges that the inverted control is in the failure state when the torque command value is saturated in the negative direction, the pitch angle detected by the posture sensor 2 is in the backward-inclined direction of the vehicle body 6, and the pitch angular velocity is in the negative direction.

The velocity controller 52 generates a torque command value based on the velocity command value generated by the controller 51 and the rotation speed of each of the wheels 7L and 7R detected by the rotation sensor 3, and outputs the torque command value that is generated to each of the wheel drive units 4L and 4R. Each of the wheel drive units 4L and 4R controls the rotational driving of each of the wheels 7L and 7R in accordance with the torque command value that is generated by the velocity controller 52.

A load sensor 55 to detect the load of an occupant applied to each of the divided steps 9L and 9R is provided in each of the divided steps 9L and 9R. The load sensor 55 is connected to the controller 51, and outputs the load value that is detected to the controller 51. The controller 51 is able to detect the dismounting of the occupant based on the load value from the load sensor 55. Accordingly, the occupant is able to dismount from the inverted two-wheel apparatus 1 safely and easily.

Figure 4:
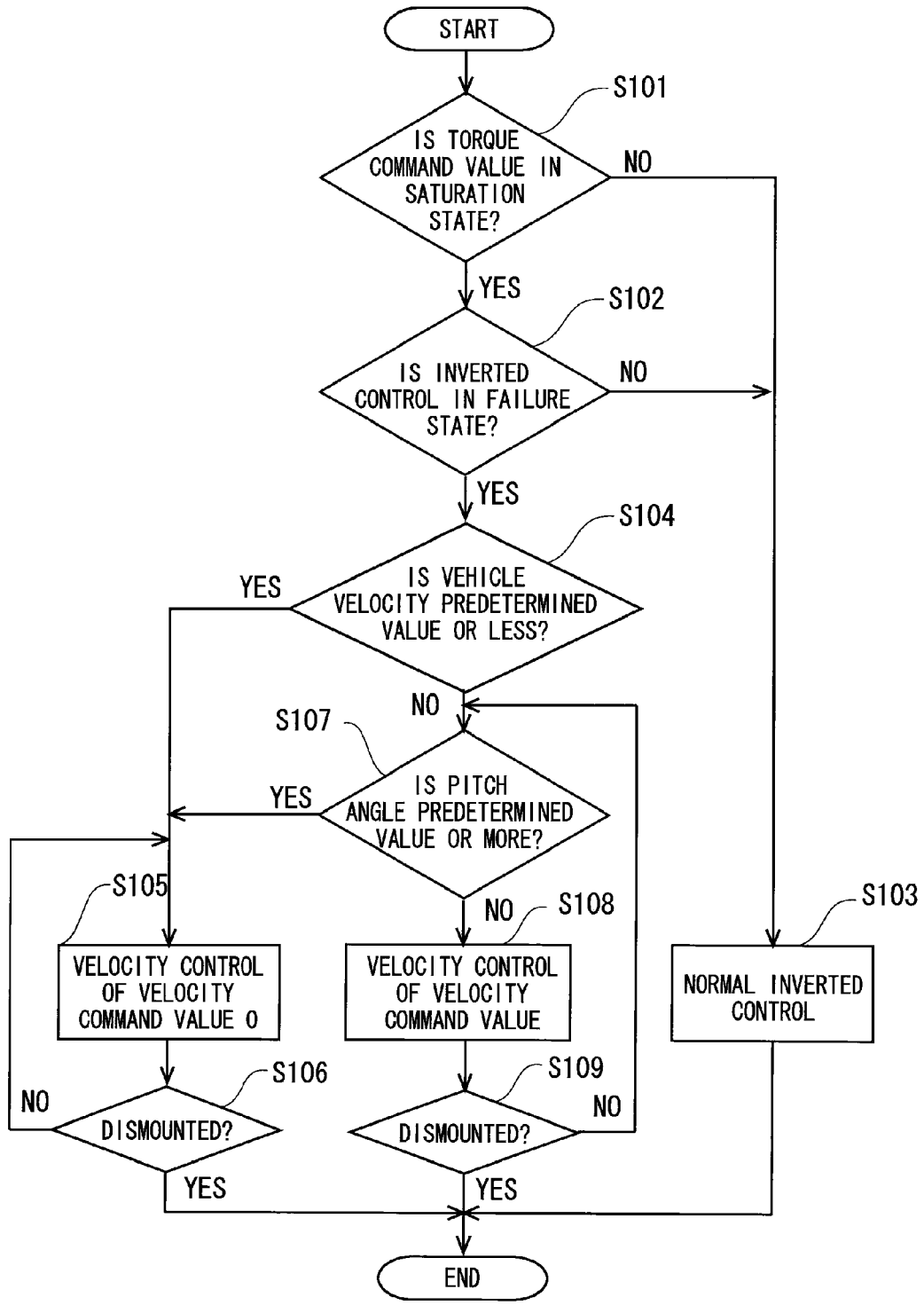
FIG. 4 is a flow chart showing one example of a control process flow of the inverted two-wheel apparatus according to the embodiment of the present invention.

Next, a control method of the inverted two-wheel apparatus 1 according to the embodiment will be described in detail. FIG. 4 is a flow chart showing one example of a control process flow of the inverted two-wheel apparatus according to the embodiment.

First, the controller 51 of the control device 5 judges whether the torque command value to the wheel drive units 4L and 4R is a predetermined value or more, and whether the torque command value is in the saturation state which makes the torque command value max (step S101). The predetermined value of the torque command value can be set, for example, based on the ability of the electric motor of each of the wheel drive units 4L and 4R, the acceleration/deceleration speed that is required, the weight of the occupant, and the like.

Next, when the controller 51 judges that the torque command value is in the saturation state which makes the torque command value max (YES in step S101), the controller 51 judges if the inverted control is in the failure state based on the pitch angle and the pitch angular velocity detected by the posture sensor 2 (step S102). On the other hand, when the controller 51 judges that the torque command value is not in the saturation state which makes the torque command value max (NO in step S101), the controller 51 continues to perform the normal inverted control as stated above (step S103), so as to end the processing. In this case, since the inverted control functions normally, the normal inverted control is continued.

After that, when the controller 51 judges that the inverted control is in the failure state based on the pitch angle and the pitch angular velocity detected by the posture sensor 2 (YES in step S102), the controller 51 judges that the inverted control is in the disabled state, and further judges if the vehicle velocity calculated based on the rotation information of each of the wheels 7L and 7R detected by the rotation sensor 3 is equal to or less than the predetermined velocity (e.g., approximately 0, which indicates a state close to the stopped state) (step S104). On the other hand, when the controller 51 judges that the inverted control is not in the failure state based on the pitch angle and the pitch angular velocity detected by the posture sensor 2 (NO in step S102), the controller 51 continues to perform the normal inverted control as stated above (step S103), so as to end the processing. In this case, since the inverted control functions normally as is similar to the above case, the normal inverted control is continued.

Further, when the controller 51 judges that the vehicle velocity calculated based on the rotation information of each of the wheels 7L and 7R detected by the rotation sensor 3 is equal to or lower than a predetermined velocity (YES in step S104), the controller 51 proceeds to the velocity control that is separated from the normal inverted control, and generates the velocity command value to maintain the vehicle velocity to substantially 0 (stopped state) (step S105).

For example, when the controller 51 executes the velocity control that continuously outputs the velocity command value=0 to the velocity controller 52 and confirms dismounting by the occupant based on the load value from the load sensor 55 (YES in step S106), the controller 51 completes the processing. In this case, although the inverted control is in the disabled state, it is close to the stopped state. Hence, the controller 51 controls the velocity to the stopped state so as to allow the occupant to safely dismount the vehicle.

On the other hand, when the controller 51 judges that the vehicle velocity calculated based on the rotation information of each of the wheels 7L and 7R detected by the rotation sensor 3 is larger than a predetermined velocity (NO in step S104), the controller 51 judges whether the pitch angle of the vehicle body 6 detected by the posture sensor 2 is equal to or larger than a predetermined angle (step S107). The predetermined angle means the angle such that a part of the vehicle body 6 touches the road surface if the vehicle further inclines, for example.

When the controller 51 judges that the pitch angle of the vehicle body 6 detected by the posture sensor 2 is equal to or larger than the predetermined angle (YES in step S107), the controller 51 proceeds to the other velocity control that is separated from the normal inverted control, so as to generate a velocity command value to maintain the vehicle velocity to substantially 0 (stopped state) (step S105).

For example, the controller 51 executes the velocity control that continuously outputs the velocity command value=0 to the velocity controller 52. After confirming the dismounting by the occupant based on the load value from the load sensor 55, the controller 51 completes the processing. Accordingly, even when the inverted control is disabled and a part of the vehicle body 6 contacts with the road surface to float the wheels 7L and 7R, it is possible to complete the control safely without idle-run of the wheels 7L and 7R.

On the other hand, when the controller 51 judges that the pitch angle of the vehicle body 6 detected by the posture sensor 2 is smaller than a predetermined angle (NO in step S107), the controller 51 proceeds to the other velocity control separated from the normal inverted control, and performs velocity control by the velocity command value (step S108). Upon confirming the dismounting by the occupant based on the load value from the load sensor 55 (YES in step S109), the controller 51 completes the processing. Meanwhile, when the controller 51 cannot confirm the dismounting by the occupant (NO in step S109), the process goes back to the processing above (step S107).

Figure 5:
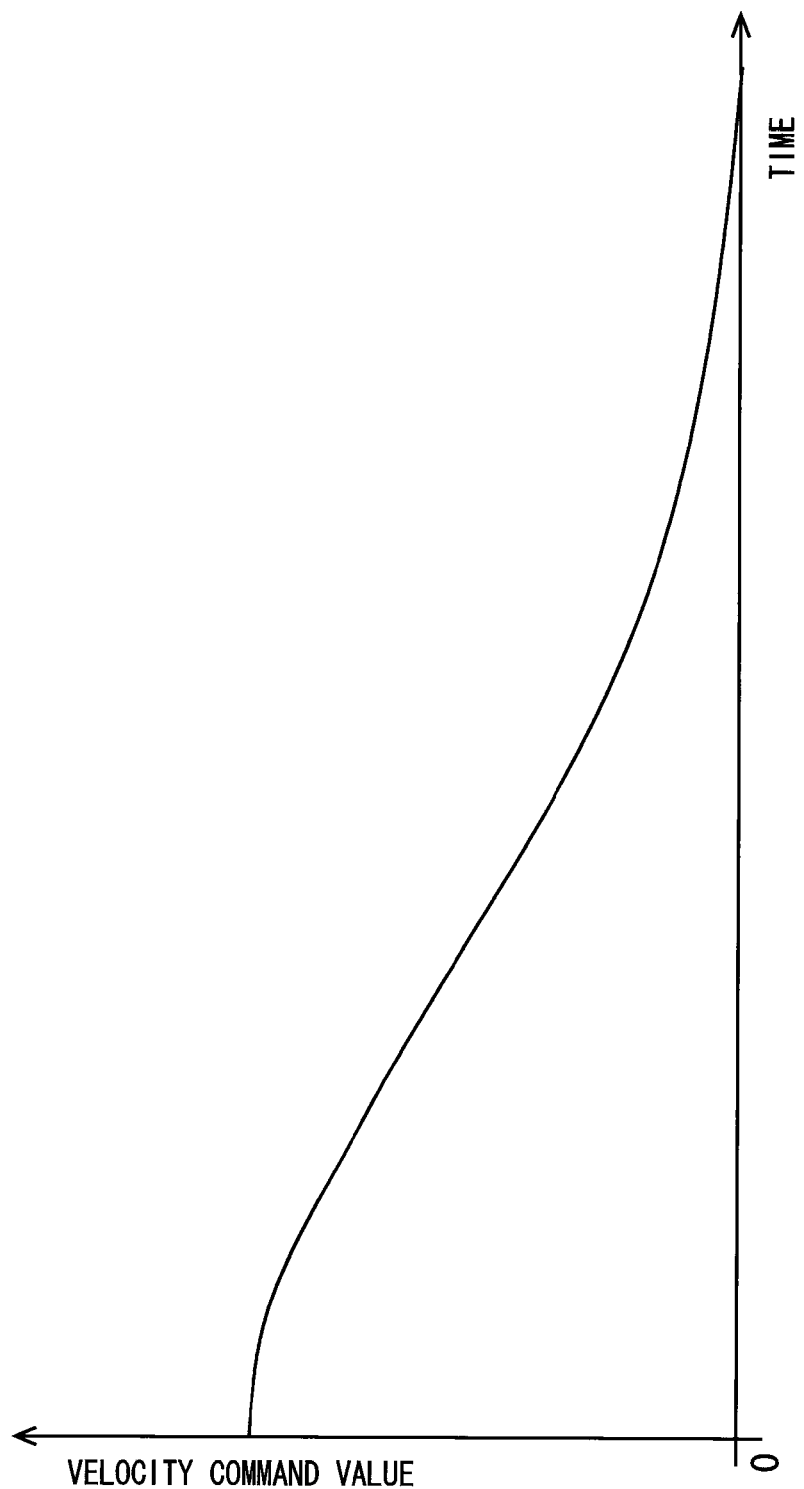
FIG. 5 is a diagram showing one example of a velocity control executed by a controller of the control device according to the embodiment of the present invention.

As shown in FIG. 5, the controller 51 performs velocity control to gradually decrease the velocity command value and to gradually decrease the vehicle velocity as the time passes. Accordingly, even when the inverted control is disabled, it is possible to decelerate and stop the vehicle without failure, and the occupant can dismount safely. Note that the method of changing the velocity command value shown in FIG. 5 is merely one example, and any method may be adopted as long as the vehicle velocity is gradually decreased.

As described above, in the inverted two-wheel apparatus 1 according to the embodiment, the control device 5 executes control to dismount the occupant upon judgment that the torque command value to each of the wheel drive units 4L and 4R is equal to or more than the predetermined value, which means in the saturation state, and the inverted control is in the failure state based on the posture information detected by the posture sensor 2. Accordingly, it is possible to decelerate and stop the inverted two-wheel apparatus 1 without failure even when the inverted control cannot be performed since the torque command value to each of the wheel drive units 4L and 4R is a predetermined value or more, which means in the saturation state, and the inverted control is in the failure state. Accordingly, it is possible to dismount the occupant safely, and to further improve the safety of the inverted two-wheel apparatus 1.

Note that the present invention is not limited to the embodiment stated above, but may be changed as appropriate without departing from the spirit of the present invention.

Figure 6:
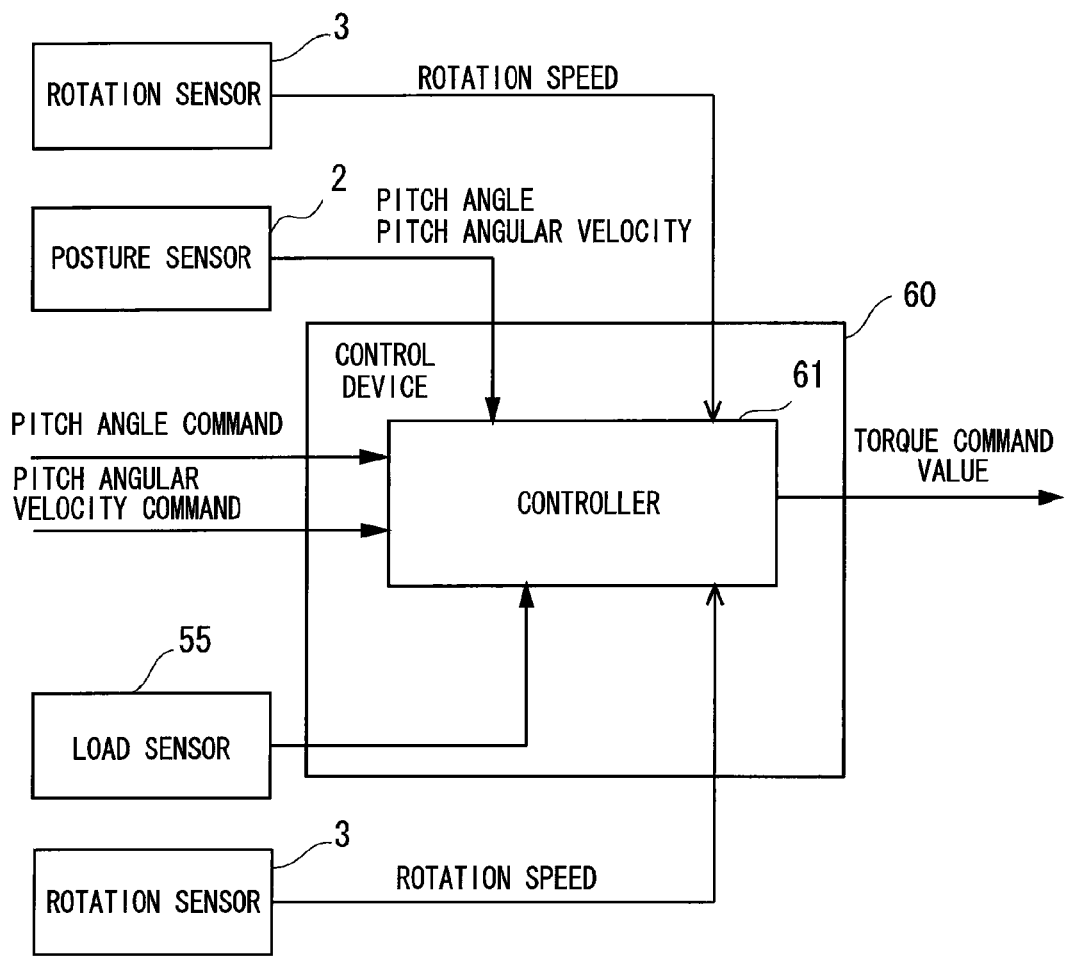
FIG. 6 is a block diagram showing a schematic system configuration of a control device of an inverted two-wheel apparatus according to another embodiment of the present invention.

For example, although the control device 5 includes the controller 51 and the velocity controller 52 in the embodiment described above, a controller 61 of a control device 60 may have the function of the velocity controller 52 (see FIG. 6).

In this case, the controller 61 generates a torque command value based on the pitch angle command value and the pitch angular velocity command value that are received, the pitch angle and the pitch angular velocity detected by the posture sensor 2, the rotation speed of each of the wheels 7L and 7R detected by the rotation sensor 3, and the vehicle velocity calculated based on the rotation information of each of the wheels 7L and 7R, and outputs the torque command value that is generated to each of the wheel drive units 4L and 4R.

Further, in the above embodiment, when the torque command value to the wheel drive units 4L and 4R is equal to or more than a predetermined value, which means in the saturation state, and the control device 5 judges that the inverted control is in the failure state based on the posture information detected by the posture sensor 2, the control device 5 performs control to dismount the occupant. However, it is not limited to this example. For example, the control device 5 may perform control to dismount the occupant upon judgment that the wheel speed is equal to or more than a predetermined speed or the wheel acceleration is equal to or more than a predetermined acceleration, which means in the saturation state, and the inverted control is in the failure state based on the posture information detected by the posture sensor 2.

Although the present invention has been described as a configuration of hardware in the embodiment stated above, the present invention is not limited to this example. The present invention may achieve the processing as shown in FIG. 4 by causing the CPU 5a to execute a computer program.

In this case, the computer program may be provided by being recorded in recording media or by being transmitted via the Internet or other communication media. The recording media include, for example, flexible disks, hard disk drives, magnetic disk drives, magneto-optical disks, CD-ROM, DVDs, ROM cartridges, RAM memory cartridges with battery backup, flash memory cartridges, and non-volatile RAM cartridges. The communication media include wired communication media (e.g., telephone lines) or wireless communication media (e.g., microwave line).

INDUSTRIAL APPLICABILITY

The present invention is applicable to an inverted two-wheel apparatus that executes desired travelling while keeping an inverted state in accordance with travelling operation by an occupant to move a center of gravity forwardly/backwardly or laterally.

REFERENCE SIGNS LIST

1 INVERTED TWO-WHEEL APPARATUS
2 POSTURE SENSOR
3 ROTATION SENSOR
4L, 4R WHEEL DRIVE UNIT
5 CONTROL DEVICE
6 VEHICLE BODY
7L, 7R WHEEL
51 CONTROLLER
52 VELOCITY CONTROLLER

The invention claimed is:

1. A travel method comprising the steps of:
providing an inverted two-wheel apparatus that travels while keeping an inverted state, the inverted two-wheel apparatus comprising:
  drive means that drives wheels;
  control means that generates a torque command value to control drive torque of the drive means; and
detecting posture information of a vehicle with a posture detection means; and
performing control with the control means to dismount an occupant upon judgment that,
  (1) when accelerating in a forward direction, the torque command value that is generated is a maximum value, which means that the torque command value is in a saturation state, and
  a pitch angle of a vehicle body is generated in a forward-inclined direction and a pitch angular velocity is generated at a front of a traveling direction, which means that inverted control is in a failure state based on the posture information detected by the posture detection means, or
  (2) when decelerating in a backward direction, the torque command value that is generated is a maximum value, which means that the torque command value is in a saturation state, and
  a pitch angle of a vehicle body is generated in a backward-inclined direction and a pitch angular velocity is generated at a rear of a traveling direction, which means that inverted control is in a failure state based on the posture information detected by the posture detection means.

2. The method according to claim 1, wherein the control means executes other velocity control that is separated from the inverted control upon judgment that the torque command value that is generated is equal to or more than a predetermined value, which means in a saturation state, and inverted control is in a failure state based on the posture information detected by the posture detection means.

3. The method according to claim 1, wherein the inverted two-wheel apparatus further comprises velocity detection means that detects vehicle velocity, wherein the control means controls the drive means to put the vehicle into a stopped state upon judgment that the torque command value that is generated is equal to or more than a predetermined value, which means a saturation state, inverted control is in a failure state based on the posture information detected by the posture detection means, and the vehicle velocity detected by the vehicle velocity detection means is equal to or lower than a predetermined velocity.

4. The method according to claim 2, further comprising executing the velocity control that gradually decreases vehicle velocity with the control means.

5. The method according to claim 1, wherein the inverted two-wheel apparatus further comprises:

vehicle velocity detection means that detects vehicle velocity; and rotation detection means that detects rotation information of the wheels, wherein the method further comprises:

generating with a controller a velocity command value based on the posture information detected by the posture detection means, the vehicle velocity detected by the vehicle velocity detection means, and the rotation information detected by the rotation detection-means; and generating with a velocity controller the torque command value based on the velocity command value generated by the controller and the rotation information detected by the rotation detection means.

6. A travel method comprising the steps of:

providing an inverted two-wheel apparatus that travels while keeping an inverted state, the inverted two-wheel apparatus comprising:

wheel drive units that drives wheels;

a control device that generates a torque command value to control drive torque of the wheel drive units; and a posture sensor that detects posture information of a vehicle, executing the control device to dismount an occupant upon judgment that, (1) when accelerating in a forward direction, the torque command value that is generated is a maximum value, which means that the torque command value is in a saturation state, and a pitch angle of a vehicle body is generated in a forward-inclined direction and a pitch angular velocity is generated at a front of a traveling direction, which means that inverted control is in a failure state based on the posture information detected by the posture sensor, or (2) when decelerating in a backward direction, the torque command value that is generated is a maximum value, which means that the torque command value is in a saturation state, and a pitch angle of a vehicle body is generated in a backward-inclined direction and a pitch angular velocity is generated at a rear of a traveling direction, which means that inverted control is in a failure state based on the posture information detected by the posture sensor.

7. A travel method comprising the steps of:

providing an inverted two-wheel apparatus that travels while keeping an inverted state, the inverted two-wheel apparatus comprising:

drive means that drives wheels;

control means that generates a torque command value to control drive torque of the drive means; and detecting posture information of a vehicle with a posture detection means;

performing control with the control means to decrease vehicle velocity upon judgment that, (1) when accelerating in a forward direction, the torque command value that is generated is a maximum value, which means that the torque command value is in a saturation state, and a pitch angle of a vehicle body is generated in a forward-inclined direction and a pitch angular velocity is generated at a front of a traveling direction, which means that inverted control is in a failure state based on the posture information detected by the posture detection means, or (2) when decelerating in a backward direction, the torque command value that is generated is a maximum value, which means that the torque command value is in a saturation state, and a pitch angle of a vehicle body is generated in a backward-inclined direction and a pitch angular velocity is generated at a rear of a traveling direction, which means that inverted control is in a failure state based on the posture information detected by the posture detection means.

* * * * *